United States Patent [19]
Cross et al.

[11] 3,712,119
[45] Jan. 23, 1973

[54] MATERIAL TESTER

[75] Inventors: Benjamin T. Cross, Jamestown, Colo.; Gerald J. Posakony, Boulder, Colo.

[73] Assignee: Automation Industries, Inc., El Segundo, Calif.

[22] Filed: Jan. 30, 1970

[21] Appl. No.: 7,340

Related U.S. Application Data

[63] Continuation of Ser. No. 644,962, June 9, 1967, abandoned, and a continuation-in-part of Ser. No. 792,217, Jan. 13, 1969, which is a continuation of Ser. No. 521,264, Jan. 18, 1966, abandoned.

[52] U.S. Cl. ................................................73/67.7
[51] Int. Cl. ............................................G01n 29/04
[58] Field of Search ....................73/71.5, 67.5–67.9

[56] References Cited

UNITED STATES PATENTS

| | | | |
|---|---|---|---|
| 2,536,128 | 1/1951 | Firestone et al. | 73/67.8 |
| 2,545,309 | 3/1951 | Roberts | 73/67.8 |
| 2,893,239 | 7/1959 | Renaut | 73/67.7 |
| 2,937,522 | 5/1960 | McGaughey | 73/67.7 |
| 2,989,864 | 6/1961 | Bamford | 73/67.8 |
| 3,050,988 | 8/1962 | Gordon et al. | 73/67.5 |
| 3,115,770 | 12/1963 | Cram et al. | 73/67.5 |
| 3,132,510 | 5/1964 | Buchan et al. | 73/67.7 |
| 3,159,023 | 12/1964 | Steinbrecher | 73/67.8 |
| 3,178,933 | 4/1965 | Bloch et al. | 73/67.8 |
| 3,188,859 | 6/1965 | Greenberg et al. | 73/67.8 X |
| 3,323,354 | 6/1967 | Daubresse et al. | 73/67.8 |
| 3,373,602 | 3/1968 | Wendt et al. | 73/67.9 |
| 3,407,650 | 10/1968 | Dickinson | 73/67.7 |
| 3,427,866 | 2/1969 | Weighart | 73/67.7 |

OTHER PUBLICATIONS

Article by Cross et al. entitled "Advancement of Ultrasonic Techniques Using Reradiated Sound Energies for Non-Destructive Evaluation of Weldments," published by Automation Industries, Inc., April 1, 1966, 26 pages (pp. 5, 8–11 and 21)

McClung, R. W. "The Immersed Ultrasonic Inspection of Metal Plate", from Non-Destructive Testing, Sept.-Oct. 1959 Vol. 17, No. 5, pp. 270–275.

C. J. Abrahams, "Practical Industrial Ultrasonic Examination", from Ultrasonics, Jan.-Mar., 1965 pp. 30–35.

E. Scott, "Pictorial System For Charting Flaws", Ultrasonics July 1966, pp. 152–156.

R. W. Buchanan et al., "Ultrasonic Flawplotting Equipment", Nondestructive Testing, Sept.-Oct. 1955 pp. 17–25.

*Primary Examiner*—James J. Gill
*Attorney*—Dan R. Sadler

[57] ABSTRACT

This invention relates to ultrasonic nondestructive testing wherein ultrasonic energy is transmitted into a workpiece and the various characteristics of the workpiece, such as the presence or absence of defects, are determined by receiving ultrasonic energy reradiated from the workpiece. The system includes one or more transmitting transducers positioned to transmit ultrasonic energy onto the surface of the workpiece at an oblique angle whereby the ultrasonic energy is converted into a shear mode and propagates laterally through the workpiece into an inspection region. If there are any discontinuities within the inspection region at least a portion of the incident shear waves are reradiated from the discontinuity. A receiving transducer is disposed laterally from the transmitting transducer and substantially normal to the surface of the workpiece for receiving the reradiated energy. In addition, several novel forms of scanning are provided for inspecting large areas of the workpiece and producing a printed record of the characteristics of the workpiece.

7 Claims, 8 Drawing Figures

Gerald J. Posakony,
Benjamin T. Cross,
INVENTORS.

BY.

*Dan R Sadler*
ATTORNEY.

Gerald J. Posakony,
Benjamin T. Cross,
INVENTORS,
BY

ATTORNEY.

Gerald J. Posakony,
Benjamin T. Cross,
INVENTORS.

MATERIAL TESTER

CROSS REFERENCE TO RELATED APPLICATIONS

This application is a continuation of co-pending application Ser. No. 644,962, filed June 9, 1967, now abandoned, for MATERIAL TESTER, Benjamin T. Cross and Gerald J. Posakony, inventors and a continuation-in-part of Ser. No. 792,217, filed Jan. 13, 1969 for MATERIAL TESTER, Gerald J. Posakony inventor which was a continuation of co-pending application Ser. No. 521,264, filed Jan. 18, 1966 for MATERIAL TESTER, Gerald J. Posakony inventor now abandoned. All of the above applications have been assigned to the assignee of this invention.

BACKGROUND OF THE INVENTION

Under certain circumstances it is desirable to inspect workpieces, such as a welded seam between two adjacent members, for hidden or internal defects. One means of making such an inspection is to X-ray the workpiece. The resultant radiograph reveals a wide variety of defects in a weld, for example inclusions, voids, etc. However, other forms of defects are not readily apparent. In addition such inspections present radiation hazards and require a considerable amount of time to perform. This is particularly true if the time required to develop the photographic negative is included.

Another form of inspection utilizes ultrasonic energy. When using ultrasonic energy to inspect a workpiece, such as the welded seam between a pair of members, the energy is transmitted through the region of the weld. If there is any discontinuities such as a void or inclusion in the weld, the ultrasonic energy is reflected and/or absorbed. In the through transmission type of system the ultrasonic energy is transmitted into the workpiece at a first location on one side of the weld and received at a second location on the other side of the weld. Any discontinuities in this transmission path prevents the energy reaching the receiving transducer. Accordingly failure to receive energy indicates a defect is probably present.

In the pulse-echo form of inspection system the ultrasonic energy is transmitted into the workpiece in the direction of the weld. If there are any discontinuities the ultrasonic energy is reflected back to the transmitting transducer or to a separate receiving transducer. Failure to receive an echo from the weld indicates a good weld. However, receiving an echo indicates a discontinuity. By observing the region from which the energy is reflected and/or the time delays it is possible to determine various characteristics of the discontinuity.

In U.S. Pat. No. 2,545,309, entitled Weld Testing Instrument a first transducer transmits ultrasonic energy into the workpiece at an angle oblique to the surface whereby it will propagate laterally into the region of the weld. A second or receiving transducer is disposed over the weldment to receive the energy from any discontinuities therein. Although such an arrangement has provided some useful information, the information has been somewhat limited and it has not been presented in a form that is readily useable by the operator. Also, the system has not been well suited for scanning large areas.

SUMMARY

The present embodiment provides means for overcoming the foregoing difficulties. More particularly the present invention provides an ultrasonic inspection system wherein a large area of the workpiece can be rapidly scanned and any discontinuities reliably identified. Moreover the information obtained from the inspection is presented in an easily understood form that can be readily correlated with any discontinuities within the workpiece.

In the limited number of embodiments disclosed herein this is accomplished by providing one or more transducers for transmitting ultrasonic energy obliquely into the workpiece and a separate transducer for receiving the energy returned from the workpiece. Means are provided for scanning one or more of the transducers across the workpiece in a predetermined relationship and producing a permanent record of the information obtained during the scanning operations.

DESCRIPTION OF THE DRAWINGS

These and other features and advantages of the present invention will become readily apparent from the following detailed description of a limited number of embodiments thereof, particularly when taken in connection with the accompanying drawings wherein like reference numerals refer to like parts and wherein.

DETAILED DESCRIPTION OF THE DRAWINGS

Figure 1:
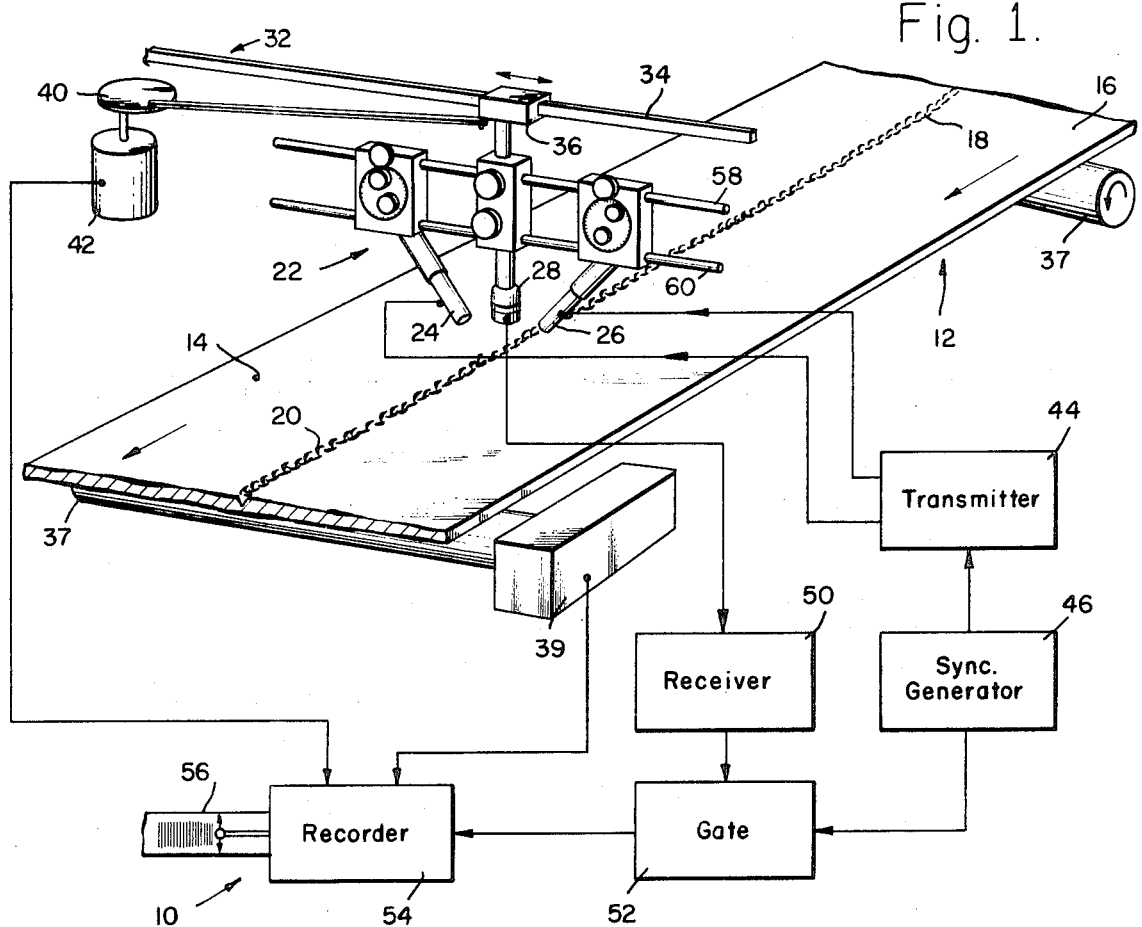
FIG. 1 is a combination block diagram and schematic view of a system embodying the present invention.
Figure 2:
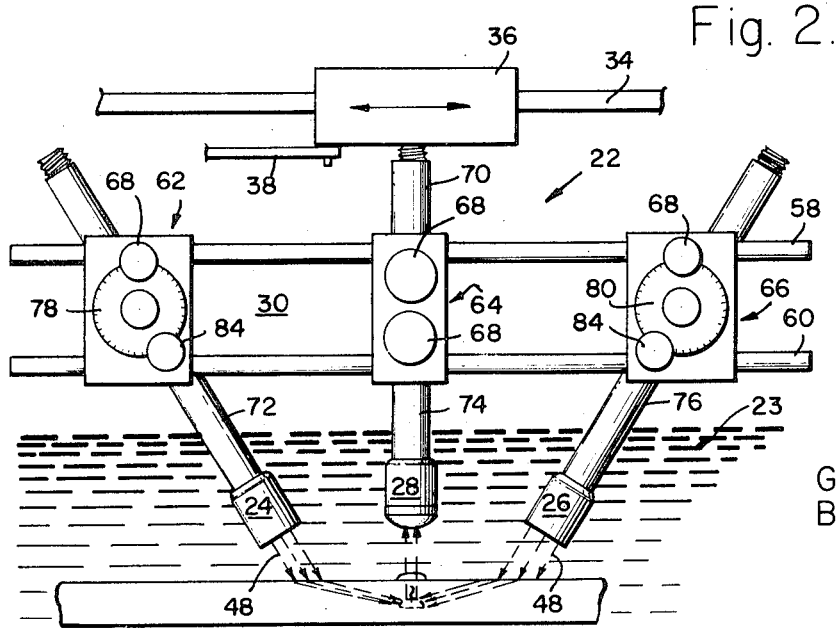
FIG. 2 is a side view of the search unit employed in the system of FIG. 1.

Referring to the drawings in more detail and particularly to FIGS. 1 to 4, the present invention is particularly adapted to be embodied in an ultrasonic non-destructive test system 10 for inspecting workpieces 12. This system 10 may be utilized for inspecting any desired type of workpiece. However, for purposes of illustration it is shown as inspecting a relatively flat workpiece. The workpiece 12 includes a first member 14 and a second member 16 that have their adjacent edges joined together by means of a butt weld 18. Although the system is described as being used for inspecting a butt weld it should be appreciated it can be employed on a wide variety of workpieces.

In a butt weld the edges of the two members 14 and 16 are normally first placed in an abutting relationship. The edges are then heated by a torch flame, electric arc, etc. whereby at least a partial fusing of the metal of the two members 14 and 16 occurs. Some of the fused metal may be supplied from a so-called welding rod. Various fluxes etc. may be employed to improve the fusion of the metals, prevent oxidation etc.

In a high quality butt welded seam, the metal immediately adjacent the edges of the joined members solidify into a single solid member. Also a portion of the metal may remain above the surface as a so-called bead 20 having a rough and irregular surface. The acoustical impedances of the original members 14 and 16 and the fused metal in the weld 18 are substantially the same throughout all parts thereof. As a consequence if any ultrasonic energy propagates between the two members 14 and 16 and/or through the weld 18, it will not be materially reflected, absorbed, attenuated etc.

In a poor or unacceptable weld one or more discontinuities may be present. These discontinuities may be in the form of a void, a crack, an inclusion of flux or slag etc., a lack of proper fusion, inadequate penetration etc. This may result from an inadequate melting of the welding rod and/or the edges of one or both of the members, a failure of the flux to completely dissipate or preventing oxidation, etc. Since the acoustical impedance at the discontinuity changes from that of the parent metal, the ultrasonic energy incident thereon will be reflected, absorbed, attenuated etc. It is, therefore, possible to locate defects in the weld 18 by transmitting ultrasonic energy into the region of the weld 18 and observing the interaction of this energy and the weld 18. However, it has been found in prior ultrasonic systems the irregular surfaces of the bead cause disturbances in the paths followed by the ultrasonic energy.

The present system 10 includes a search unit 22 capable of both transmitting ultrasonic energy and receiving such energy. Since air is highly attenuative to ultrasonic energy it is desirable to provide some form of acoustical coupling between the search unit 22 and the workpiece 12. In this embodiment this is accomplished by submerging both the workpiece 12 and search unit 22 in a bath of liquid 23, such as water. This liquid bath may be contained in a test tank (not shown). As will become apparent subsequently, the search unit 22 may be coupled directly to the workpiece to provide a so-called contact inspection.

The search unit 22 includes at least one transducer 24 and in some instances a second transducer 26 for transmitting ultrasonic energy and at least one transducer 28 for receiving ultrasonic energy. The search unit 22 includes a rigid structure or frame 30 which is carried by a scanning mechanism 32. This mechanism 32 scans the search unit 22 across the surface of the workpiece 12 and particularly in the region to be inspected, i.e., the weld 18. In the present instance the scanning mechanism 32 includes a so-called bridge or guide 34 which extends over the workpiece 12. A slide 36 is mounted upon the guide 34 and is connected by means of a link 38 to an eccentric 40 driven by a motor 42. The search unit 22 is attached to this slide 36. As a result the entire search unit 22 is reciprocated across the weld 18 in a direction substantially normal to the length of the bead 20.

In addition the guide 34 may be moved longitudinally of the workpiece 12 substantially parallel to the bead 20 and/or the workpiece 12 may be moved past the search unit 22. In the present instance the workpiece 12 is positioned on a pair of rollers 37 driven by a motor 39 whereby the workpiece 12 is carried beneath the search unit 22. By relating the speed at which the search unit 22 reciprocates across the bean 20 to the speed at which it travels parallel to the bead 20, the transducers 24, 26 and 28 may be made to follow a prescribed search pattern over the welded region.

For example, the search unit 22 may be reciprocated across the weld 18 at a relatively high rate of speed while the search unit 22 advances at a slow rate of speed parallel to the bead 20. This will cause the weld region to be scanned in a series of parallel transverse lines. Conversely the search unit 22 may be moved primarily parallel to the bean 20. At the end of each trip along the head 20 the search unit 22 is indexed a small increment laterally on the guide 34. This will cause the weld region to be scanned in a series of substantially parallel longitudinal lines.

A suitable transmitter 44 of any suitable variety may be provided for driving the transmitting transducers 24 and 26. Each transducer normally includes a piezoelectric crystal or a similar device which mechanically vibrates and radiates sonic energy when excited by an electric signal. The transmitter 44 is effective to provide an electrical signal which causes ultrasonic energy of the desired nature to be radiated. If the system 10 is to operate in a continuous wave or CW mode, the transmitter 44 would normally include an oscillator for providing an essentially continuous electrical signal of the required frequency.

In the present instance the system 10 operates in a pulse-echo mode, i.e., the ultrasonic energy is transmitted in a series of intermittent pulses. Accordingly the transmitter 44 includes a pulser which generates a series of short duration pulses. A clock or sync generator 46 provides a series of timing pulses which are essentially periodic and control the pulse repetition rate of the system 10, i.e., each time a timing pulse occurs the transmitter 44 produces a corresponding driving pulse.

The pulse repetition rate may be of any desired amount but is normally on the order of a few kilocycles. The pulses of ultrasonic energy may be of relatively short duration, for example a half cycle or less up to several complete cycles. The frequency of the ultrasonic energy in the radiated pulse may be of any level but it is normally ultrasonic, i.e., above the response level of the human ear and may have a frequency in a range extending from less than 0.25 megacycles up to 25 megacycles or higher. The transmitting transducers 24 and 26 are effective to radiate the pulses of ultrasonic energy in well defined beams 48.

The receiving transducer 28 normally includes a piezoelectric crystal or similar device which produces an electrical signal in response to incident ultrasonic energy. The transducer 28 is coupled to a receiver 50 for receiving and/or detecting the electric signals produced by the transducer 28. The receiver 50 may include a large number of complex functions such as automatic gain control, etc. depending upon the particular type of inspection to be performed.

In the present instance the receiver is shown as coupled to a gate 52 effective to close and block the passage of signals or open and pass the signals. The gate 52 is coupled to the sync generator 46 and is effective to open and close in synchronism with the transmission of the ultrasonic energy. As a consequence the gate 52 will only pass the received signals occurring at a particular time after the transmission of the initial pulse.

The output from the gate 52 may be coupled to any suitable utilizing means. Normally this includes a means for producing a display which can be visually observed by the operator. Although the display means may be of any desired variety, such as an oscilloscope, it is illustrated as a so-called strip chart recorder 54. This is effective to produce a permanent record on a strip of paper 56.

The recorder 54 is normally coupled to the scan mechanism 32 that moves the search unit 22 and/or the drive 39 that moves the workpiece 12. The recorder 54 is thereby synchronized with the movement of the search unit 22 relative to the workpiece whereby a scaled reproduction of the characteristics of the workpiece 12 may be made. If a 1-to-1 scale is used the recording 56 may be laid directly over the weld 18 for locating any defects.

The search unit 22 may be constructed in any desired manner. Although the transducers may be permanently mounted in a fixed position, it has been found desirable to make the various transducers 24, 26 and 28 adjustable both as to their relative positions and as to their angles. This will permit a greater flexibility in the uses for the search unit 22 and the types and sizes of workpieces which can be inspected.

The search unit includes a frame 30 having a pair of parallel bars 58 and 60. A separate mounting block 62, 64 and 66 is provided for each transducer 24, 26 and 28. Each block 62, 64 and 66 includes a thumb screw 68 for locking the block in position on the bars or allowing it to move thereon. One of the blocks 64, for example the center one, includes a mounting 70 which is effective to be secured to the slide 36. The search unit 22 will thereby be carried back and forth across the workpiece 12 during a scanning operation.

A separate search tube 72, 74 and 76 is provided for each of the transducers. The tubes 72 and 76 are normally mounted in a cylinder 78 and 80 rotatably disposed in the center of the block. Each of the cylinders 78 and 80 is free to rotate inside of its mounting block 62, 64 and 66 respectively. However, a thumb screw 84 or similar device is provided to lock the cylinders 78 and 80 in position. Each tube 72, 74 and 76 extends downwardly beyond its block and is adapted to have a transducer 24, 26 and 28 respectively threaded into the end of its tube.

Any electrical cables, etc. for the transducers 24, 26 and 28 are disposed inside the tubes and extend to the transmitter 44, receiver 50, etc. It may be seen that by releasing the thumb screws 68 and 84 the mounting blocks 62, 64 and 66 may be moved laterally across the two bars 58 and 68 and/or the angles of the search tubes 72 and 76 may be varied to any desired level.

The transducers 24, 26 and 28 may be arranged in any desired configuration but in the present embodiment a single receiving transducer 28 is disposed in the middle of the search unit 22. The tube 74 is normally set with the axis of the transducer 28 substantially perpendicular to the surface of the workpiece 12. A single transmitting transducer may be provided if desired, but in order to increase the capabilities of the system a pair of substantially identical transducers 24 and 26 are disposed on the opposite sides of the receiving transducer.

The two transducers 24 and 26 are inclined inwardly toward each other whereby the ultrasonic energy enters the workpiece 12 oblique to the surface and propagates into a region aligned with the receiving transducer 28. It has been found desirable for all three of the transducers 24, 26 and 28 to be disposed in a common plane.

In order to employ this form of the invention the workpiece 12 is first submerged in a bath of couplant contained in an immersion tank. The workpiece 12 is disposed beneath the search unit 22 with the inspection area (the welded scan 18 in this instance) substantially parallel to the direction of the longest scan (the direction the workpiece travels in this instance).

Figure 4:
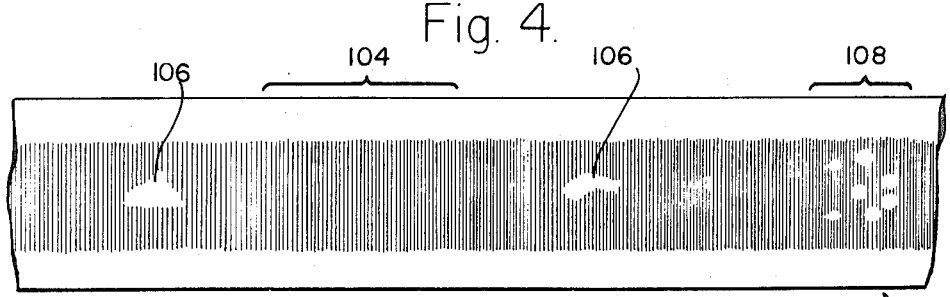
FIG. 4 is a view of one type of record produced by one form of the system.
Figure 4:
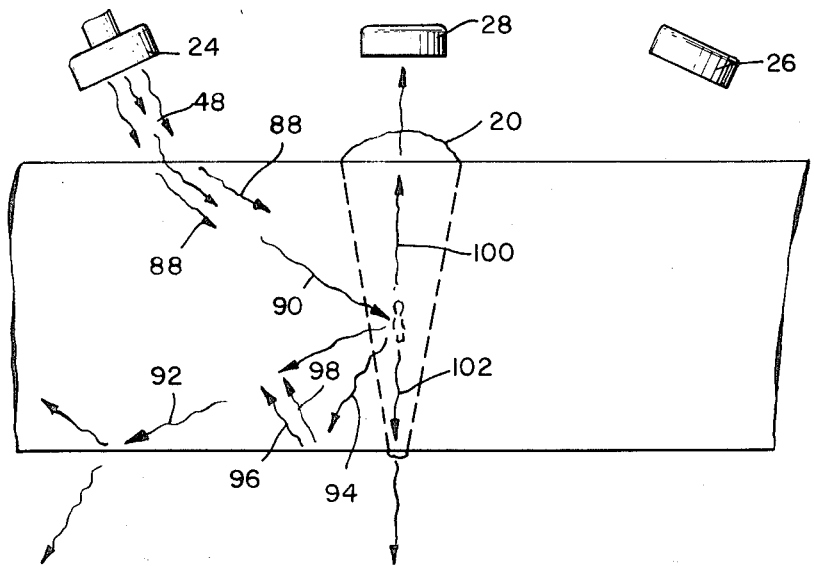

The search unit 22 is then scanned back and forth across the weld bead 20 at a relatively high speed while the workpiece 12 advances past the search unit 22 at a slow speed. This will cause the entire weld 18 to be scanned in a series of substantially parallel lines perpendicular to the bead 20. At the same time and in synchronism therewith the recorder 54 scans the paper tape 56 so as to make a permanent record. As seen in FIG. 4, this provides a record which includes a series of transverse parallel lines.

Figure 3:
FIG. 3 is a cross sectional view, on a greatly enlarged scale, of the workpiece showing what is believed to be some of the modes in which the ultrasonic energy propagates through the workpiece.

As the search unit 22 scans across the workpiece, the transmitter 44 periodically excites the transducers 24 and 26 whereby pulses of ultrasonic energy are obliquely coupled through the surface of the workpiece 12 and into the region of the weld 18. FIG. 3 is believed to be a reasonably accurate representation of the manner in which this ultrasonic energy from transducer 24 propagates through the surface and into the workpiece 12. The energy from the second transmitting transducer 28 propagates through the surface and into the workpiece in a similar manner but in a reverse direction.

Normally the preponderance of the transmitted energy in the liquid is radiated in a longitudinal wave mode. Because of the oblique direction of the transmitted beam 48 a certain amount of refraction occurs and the direction of the beam 48 changes. The amount of refraction is dependent upon the angle of incidence, the relative acoustic impedances, etc. In addition the mode in which the energy propagates is converted from longitudinal waves into shear waves.

The angle of incidence, the spacings between the transmitting transducers 24 and 26 and the receiving transducer 28 are all adjusted such that the ultrasonic energy propagates laterally through the workpiece and substantially "floods" the region of the workpiece aligned with the receiving transducer 28, i.e., the entire weld from the front and to the back is permeated with ultrasonic energy.

As stated before, the single transmitting transducer 24 may be used. However, it has been found by employing two separate transmitting transducers 24 and 26 the entire area is "illuminated" with energy from two different directions. This reduces or eliminates the possibility of a discontinuity being oriented so as to avoid detection.

If the weld 18 is homogeneous and free of discontinuities the ultrasonic energy from both directions will propagate through the weld and into the other member with very little, if any, disturbance. The energy in the shear wave travels into the region beyond the inspection region and eventually dissipates. Substantially no energy travels toward either the top or bottom surfaces of the workpiece, nor is any energy coupled from the top surface toward the receiving transducer 28.

If the inspection region, i.e., the weld, includes a discontinuity 86 such as a void, a crack, an inclusion, a lack of penetration, a lack of fusion etc. there is a pronounced mismatching of acoustical impedances. Some of the divergent rays 88 in the beam 48 may miss the discontinuity 86 if the discontinuity is small compared to the diameter of the beam. However, some of the rays 90 are incident upon the discontinuity 86 and several effects occur. First of all some of the energy in the shear wave 90 is reflected from the discontinuity as a shear wave 92. This reflection is substantially symmetrical (with respect to the reflecting surface) and the incident energy thereby reflected downwardly toward the opposite surface of the workpiece 12. This energy 92 is internally reflected or coupled through the surface as a longitudinal wave. This energy is eventually dissipated and will be ignored hereafter.

Some of the shear wave energy 90 incident upon the discontinuity is converted into a longitudinal wave 94 and reflected toward the back surface. A portion of the longitudinal wave 94 is reflected internally from the surface as a longitudinal wave 96 while some is also converted into a shear wave 98. This energy 98 is also eventually dissipated and will be ignored hereafter. It will be noted very little, if any, of the foregoing energy emerges from any portions of the workpiece 12 either directly above or directly below the discontinuity 86. All of the foregoing phenomena are fairly well understood and described in the prior art.

However, in addition to the reflections of the energy described above, it has been found a considerable amount of the energy is "reradiated" from the discontinuity 86 as rays 100 and 102. The mechanics by which this phenomena occur are not completely understood at this time. However, based upon the measurement of various velocities, time delays, etc. it appears this energy is reradiated in the form of a compression wave. This reradiation is believed to be a result of the physical vibrations of the discontinuity 86 produced by the incident energy.

A major portion of the reradiated energy appears to be produced around the opposite ends of any discontinuities 86 in directions approximately normal to the direction of the incident shear wave. As a result the reradiated energy 100 and 102 travels substantially normal to the opposite surfaces of the workpiece 12 and propagates through the interface to the receiving transducer 28. Because of the nearly right angle relationship between the reradiated energy 100 and 102 and the surface very little, if any, refraction occurs as the energy emerges from the surface. The energy passing through the surface is received by the transducer 28 and a corresponding electrical signal is produced.

It has been found substantially all of the reradiated energy is concentrated into a small zone and emerges from a very small part of the surface of the workpiece 12. As a consequence the receiving transducer 28 must be located directly over the discontinuity 86 in substantial alignment therewith. If the receiving transducer 28 is disposed laterally even a relatively short distance from the discontinuity 86 it will receive very little or no reradiated energy. This characteristic can be further enhanced if receiving transducer 28 has a lens 110 which focuses the response characteristics into a very narrow beam.

As the search unit 22 passes transversely over the weld 18 the energy transmitted from the transducers 24 and 26 propagates throughout all areas of the weld 18. If there are no discontinuities the energy will pass from one of the members 14 or 16 through the weld 18 and into the opposite member. Under these circumstances the receiving transducer 28 does not receive any energy.

If the weld 18 is defective and contains a crack, void, inclusion etc. during the course of a scan at least a portion of the energy propagating laterally through the workpiece 12 will be incident upon the discontinuity 86 and will be reradiated as described above. As a consequence when the receiving transducer 28 passes over such a discontinuity it will receive the reradiated energy and produce a corresponding signal. If the receiving transducer 28 is not aligned with the discontinuity 86 it will not receive any significant amount of reradiated energy.

The signal produced by the receiving transducer 28 is coupled through the receiver 50 and gate 52 to the recording apparatus 54. The received signal will then actuate the recorder 54 and cause a record of the discontinuity 86 to be made on the paper strip 56. The gate 52 which is synchronized with the transmission of the initial pulses, opens only during short intervals following the transmission. This interval corresponds to the time when any energy reradiated from a discontinuity 86 will be received by the transducer 28. Any energy received from spurious sources will not occur during the open interval of the gate 52 and will not reach the recorder 54 and will not produce a record. It has also been found desirable to provide a threshold circuit in the recorder 54 (or elsewhere) which will not pass signals below a threshold level. If a signal below this level occurs no record is made on the paper strip 56. This level is set to correspond to the level produced by an objectionable discontinuity.

The recording apparatus 54 may be set to make a record or mark on the paper only when the transducer 28 is receiving ultrasonic energy from a discontinuity and the gate 52 passes the signal. This form of operation provides a normally clear record with dark marks representing any defects that are present.

However, for various reasons it may be desirable to provide the converse form of operation, i.e., a negative record. The present embodiment operates in this mode. The recording apparatus 54 records a line so long as the receiving transducer 28 does not receive any ultrasonic energy and does not record when energy is incident upon the receiving transducer. This provides a negative type of recording wherein an acceptable weld is recorded as an unbroken dark pattern. Any discontinuities in the weld will cause a disruption in the recording and will appear as light areas.

This mode of operation has several advantages. The operator can quickly confirm whether the system 10 and recorder 54 are operating correctly. Also, if the system 10 fails to record properly it makes a record corresponding to a defective weld whereby an uninspected weld is not passed. In the first mode of operation if the system is not functioning properly a defective weld may be passed since no record would be made.

In addition the negative mode of operation provides a record having a general appearance of the negative or radiograph produced by a conventional X-ray inspection of the weld. However, unlike an X-ray inspection the present system does not have any high voltage or radiation health hazards. It is also much cheaper, simpler and faster to operate than the X-ray, particularly if the development of the resultant negative is considered. In addition it has been found that varying the search pattern, the gating and threshold levels etc. it is possible to make the system record just those types of discontinuities which are primary concern.

A typical recording for this system 10 is shown in FIG. 4. This includes a series of substantially parallel transverse scan lines corresponding to the scanning by the search unit 22 transversely across the weld 18. When the weld 18 is accepted the recording includes a dark unbroken region 104. However, if the weld has a portion which contains a void etc. the recording includes a corresponding light area 106 and if it contains a portion having a large amount of porosity a corresponding number of light spots 108 are produced.

Figure 5:
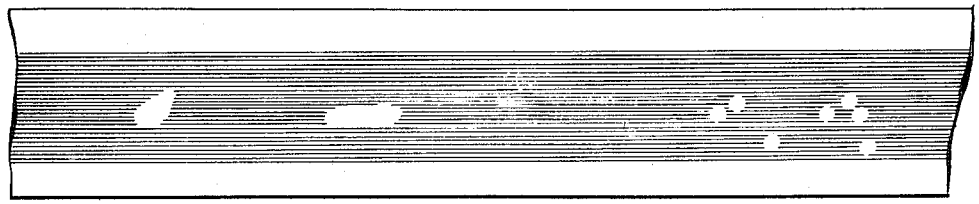
FIG. 5 is a view of another type of record produced by another form of the system.

As stated earlier the search unit 22 may be scanned longitudinally of the weld in a series of parallel sweeps. If this type of scanning is employed the recorder 54 may be operated in the same manner. This produces a record such as shown in FIG. 5.

Figure 6:
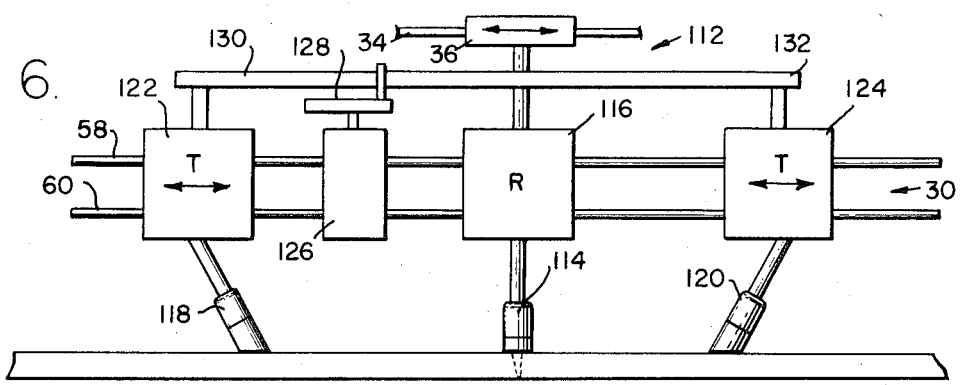
FIG. 6 is a side view of a different form of search unit employing a different form of scanning.

It will be appreciated that the foregoing system 10 is capable of inspecting various types of workpieces and particularly the butt weld 18 between a pair of member 14 and 16. However, under some circumstances it may be desirable to employ a search unit 112, such as shown in FIG. 6. A receiving transducer 114 is mounted on a block 116 locked in the center of the frame 30. A pair of transmitting transducers are mounted on blocks 122 and 124 on the opposite sides of the receiving transducer 114. However, unlike the first embodiment these are free to slide along the two bars 58 and 60.

A motor 126 is mounted on the bars 58 and 60 and includes and eccentric 128 which is coupled to the two transducers by a pair of links 130 and 132. As the eccentric 130 rotates the two block 122 and 124 reciprocate back and forth, toward and away from the receiving transducer 114. These blocks 122 and 124 may travel inwardly at the same time or alternately. The transducers 114, 118 and 120 are mounted on the lower ends of search tubes 134 which extend below the blocks.

Although this search unit 112 may be submerged in a test tank similar to the search unit 22 it is adapted to provide a contact type of test. More particularly the receiving transducer 114 includes a shoe 138 which is contoured to fit over the bead 20 on the weld 18 and slide longitudinally therealong. In addition coupling shoes 140 and 142 are provided on the two transmitting transducers 118 and 120 for sliding upon the surface of the workpiece 12. Normally a liquid couplant such as a film of water, glycern etc. is provided between the surfaces of the shoes and the surface of the workpiece.

It will be appreciated during the operation of this system the two transmitting transducers 118 and 120 move back and forth across the surface of the workpiece 12 while the receiving transducer 114 travels slowly lengthwise of the weld 18. The ultrasonic energy transmitted into the workpiece 12 will thereby propagate throughout a wider range of the workpiece and during the course of a scan will permeate the weld region in a wide variety of different directions. This form of system is particularly useful when testing relatively thick members wherein it is difficult to provide a single beam which will produce ultrasonic energy in all portions of the weld. It is also effective to direct the energy through the weld in a variety of directions whereby a defect cannot be oriented so as to escape detection. If desired this search unit 112 may also be mounted upon the sliding block 36 whereby the entire search unit 112 scans back and forth across the weld area as the two transmitting transducers 118 and 120 reciprocate toward and away from the receiving transducer 114.

Figure 7:
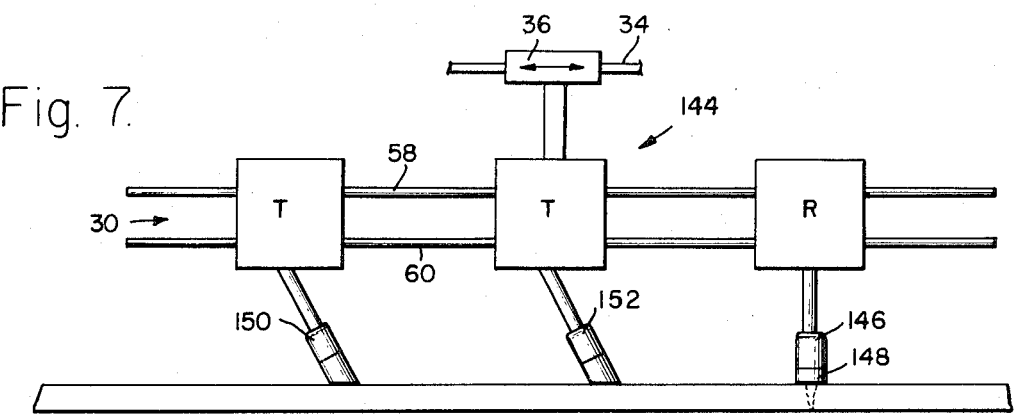
FIG. 7 is a side view of a further form of search unit employing a further form of scanning.

As an alternative it may be desirable to utilize the search unit 144 of FIG. 7. In this search unit 144 a single receiving transducer 146 is provided for being coupled to the weld 18 by means of a contact shoe 148. A pair of transmitting transducers 150 and 152 are mounted on a common side of the receiver 146. This is effective to cause the ultrasonic energy to propagate through the workpiece 12 and into the weld region from a wider variety of different directions. As a consequence even through the discontinuity may be orientated at a peculiar angle, energy from one or both of the transducers 150 and 152 will be incident upon the discontinuity. Also the time delays vary and the opening of the gate 52 etc. may be modified to provide an improved resolution. Thus, irrespective of the orientation of the discontinuity it will reradiate ultrasonic energy.

Figure 8:
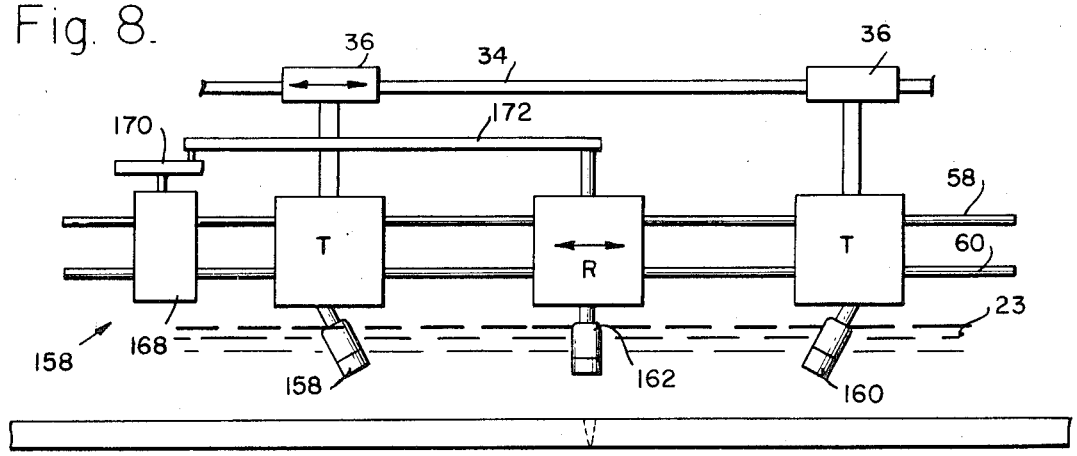
FIG. 8 is a side view of another form of search unit employing another form of scanning.

As another alternative the search unit 156 of FIG. 8 may be employed. In this embodiment the transmitting transducers 158 and 160 are mounted in a fixed position on the two bars 58 and 60 of the frame 30. However, the receiving transducer 162 is slideably disposed on the two bars 58 and 60 in a position between the two transmitting transducers 158 and 160. A drive motor 168 and eccentric 170 are coupled to the receiving transducer 162 by a link 172. This is effective to cause the receiving transducer 162 to scan back and forth over the weld 18. It will be seen that this will permit a complete scan of the weld region by the receiving transducer 162 so that a recording can be made.

While only a limited number of embodiments of the present invention have been disclosed herein it will be readily apparent to persons skilled in the art that numerous changes and modifications may be made without departing from the invention. For example, although the invention has only been shown as used for inspecting welds, it is readily apparent it may be employed for inspecting any type of workpiece. Each embodiment employs a pair of transmitting transducers and a single receiving transducer. It should be understood it is possible to employ a single transmitting transducer or more than two transmitting transducers or more than one receiving transducer. Moreover although all of the transducers have been described as being on the same side of the workpiece, in some systems it may be desirable to place the transducers on opposite sides of the workpiece for example, the transmitting transducer may be on one side and the receiving transducer on the other. It should also be noted the mode in which the various transducers scan the workpiece and their movement relative to each other may be varied so as to satisfy the inspection requirement of any particular workpiece and to optimize the amount of energy reradiated from particular types of discontinuities. Accordingly, the foregoing drawings and description thereof are for illustrative purposes only and do not in any way limit the scope of the invention which is defined only by the claims which follow.

We claim:

1. Ultrasonic inspection means for inspecting a workpiece including:
   a first transducer for transmitting pulses of ultrasonic energy into the workpiece in response to an electrical signal;
   a second transducer having a sensitive axis for receiving reradiated ultrasonic energy from the workpiece and producing an electrical signal corresponding thereto;
   mounting means securing said first and second transducers together in a predetermined angular spaced relation to each other, said first transducer being angular to the surface of the workpiece and the sensitive axis of said second transducer being normal to the surface of the workpiece;
   gating means synchronized with the transmitted pulses of said transmitting transducer for gating only portions of the reradiated ultrasonic energy;
   means for scanning one of said transducers relative to the other transducer in the predetermined angular relationship along a scan line extending over the surface of the workpiece, and
   recording means coupled to said second transducers and responsive to said gating means for providing a record of the gated portions of reradiated energy.

2. The ultrasonic inspection means as defined in claim 1 wherein said transducers being disposed on a common plane substantially parallel to said scan line.

3. The ultrasonic inspection means of claim 1 wherein:
   said transducers being disposed on a common plane; and
   said scan means for scanning both of said transducers at a first rate in a first direction substantially parallel to the plane and at a second rate in a second direction substantially normal to the plane.

4. Ultrasonic inspection apparatus for inspecting a region of a workpiece having a welded seam, said apparatus including:
   a pair of transmitting transducers disposed on the opposite sides of the weld seam for transmitting beams of ultrasonic energy into said workpiece for propagating through the weld in the form of shear waves,
   a receiving transducer having a sensitive axis disposed between said transmitting transducers, said receiving transducer including a sensitive axis being disposed normal to the surface of the workpiece to receive ultrasonic energy reradiated from the workpiece and produce an electrical signal in response thereto, and
   means for scanning the receiving transducer back and forth between the transmitting transducers and over the portion of the workpiece containing the weld seam.

5. The inspection apparatus as defined in claim 4 including recording means coupled to said receiving transducer and responsive to the signals therefrom for producing a record of the signals.

6. Ultrasonic inspection apparatus for inspecting a region of a workpiece having a welded seam said apparatus including:
   a transmitting transducer disposed on one side of said weld seam for transmitting beams of ultrasonic energy into the workpiece for propagating the ultrasonic energy into the weld region;
   a receiving transducer having a sensitive axis, the sensitive axis of said receiving transducer being disposed normal to the surface of the workpiece for receiving ultrasonic energy reradiated from the workpiece and producing an electrical signal in response thereto; and
   means for scanning the receiving transducer and the transmitting transducer relative to each other and on an axis crossing over the weld seam of the workpiece.

7. The ultrasonic inspection apparatus as defined in claim 6 wherein said receiving transducer scans vertically across the weld seam.

* * * * *